United States Patent Office 3,414,861
Patented Dec. 3, 1968

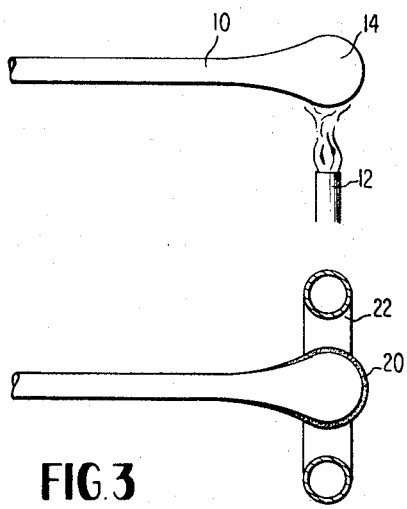
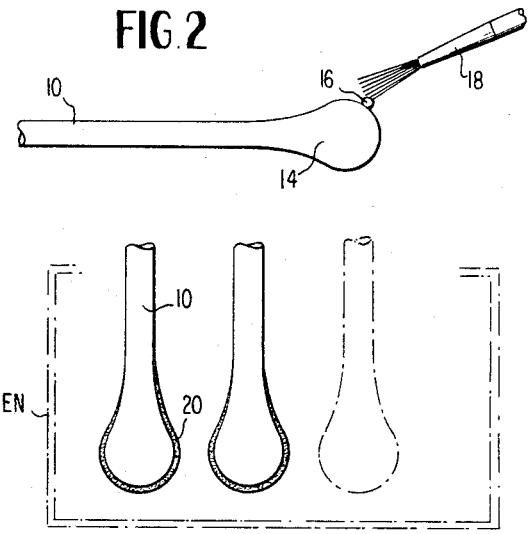
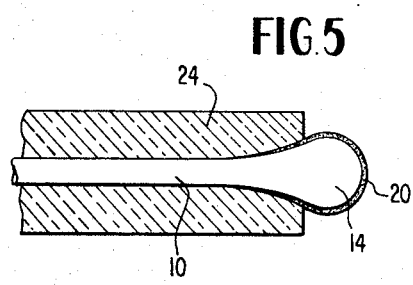
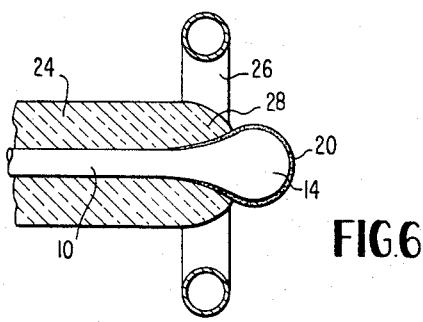
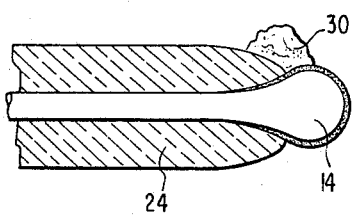
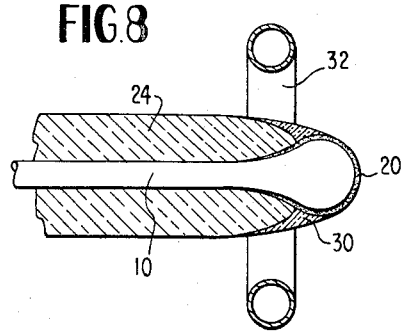
INVENTORS
JOHN L. LUMLEY
EDWARD P. JORDAN

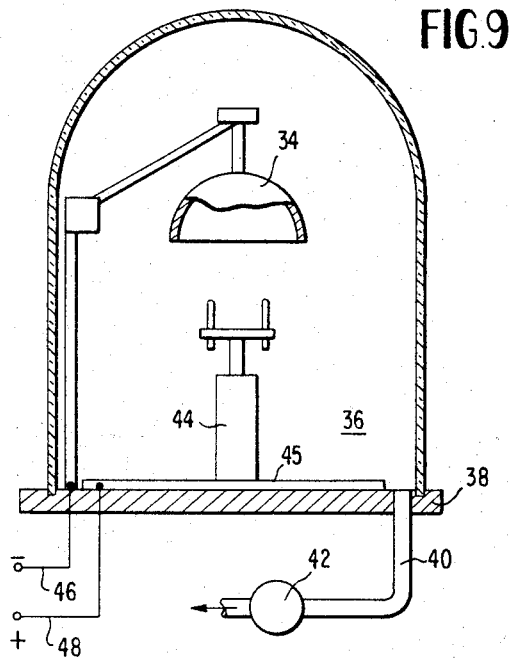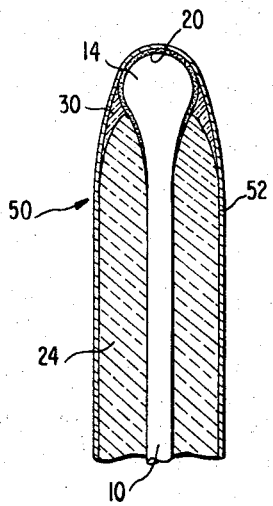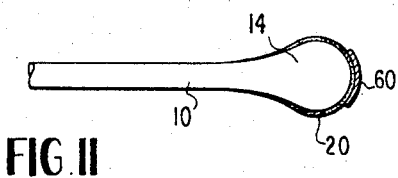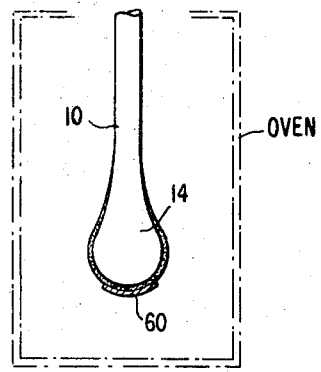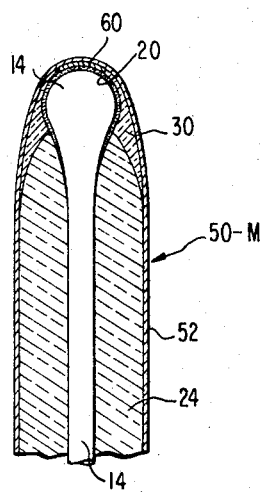

3,414,861
THERMISTOR AND METHOD OF MANUFACTURE
John L. Lumley, State College, and Edward P. Jordan, Pennsylvania Furnace, Pa., assignors, by mesne assignments, to Research Corporation, New York, N.Y., a nonprofit corporation of New York
Filed Mar. 30, 1966, Ser. No. 538,802
11 Claims. (Cl. 338—22)

ABSTRACT OF THE DISCLOSURE

A thermistor constructed of a wire having an enlarged bulbous head at one end. A thermistor material covers the bulb, and is in turn covered by a conductive film, such as platinum deposited by a sputtering process. The wire is supported within a glass tube.

---

This invention relates to thermistors and their method of manufacture. More particularly, the invention relates to a novel thermistor and method of manufacture wherein one of the electrical contacts of the thermistor by view of the configuration may be directly exposed to a fluid whose temperature is to be measured.

In general, a thermistor is a temperature sensitive device utilized in many fields of technology, as for example in the measurement of temperature. The coefficient of electrical resistance of a thermistor is such that with increasing temperature the electrical resistance of the thermistor decreases. This follows from the nature of the materials employed, the materials generally being classified under the terms semi-conductor materials and/or ceramic materials.

In general, many prior thermistors have suffered the disadvantage of relatively slow response to changes in temperature. For example, a typical prior thermistor would comprise a ceramic material surrounding two electrical contacts, i.e., the electrical contacts being embedded therein. The resistance change between the electrical contacts is a function of the temperature change between these electrical contacts and accordingly a different measured electrical resistance would correspond to a difference in temperature of a fluid in which the thermistor is placed. In order for a change in temperature to be sensed, it is necessary for the temperature signal, i.e., the change from one temperature to another, to propagate or to pass from the surface of the thermistor material to the electrodes in center. The poor thermal conductivity of thermistor materials attenuates the temperature signal or temperature change and accordingly high frequencies, i.e., rapid changes in temperature, are rather strongly attenuated or weakened. This obviously places a frequency limitation on the use of such types of thermistors. In other words, if the temperature of the fluid in which the thermistor is placed changes rather rapidly, there is not enough time for the temperature change to be transmitted through the thermistor material and accordingly sensed as a change of resistance between the electrical contacts which are embedded in the thermistor material.

Another example of a prior thermistor configuration is exemplified by U.S. Patent 3,219,480 to Girard wherein thermistors have been made in thin layers so that the layer of thermistor material loses or gains heat from one surface with the resistance change being measured between two electrodes or two points on the other surface. While an improvement in some areas of use over the spherical geometry often encountered in the prior art, this construction suffers essentially the same drawbacks as the spherical geometry. Thus, the current passing between the elecodes may pass through the body of the film or layer of thermistor material, avoiding the high resistivity of the surface of such a thermistor so that changes in resistivity at the surface which is exposed to the fluid is not fully sensed.

According to the practice of the present invention, a thermistor geometry is employed where one of the electrodes of the thermistor, i.e., one contact, is applied to the outer surface of the thermistor as a sputtered, evaporated or otherwise deposited conducting film so that the direction of electrical current and heat flow is normal to the surface. Thus, resistance changes which are to be sensed are detected primarily in the external surface layer and, further, a large temperature gradient exists at the outer surface of the device, producing essentially a thin skin of rather high electrical resistance. Accordingly, the speed of response to a change in surface conditions is independent of the specific geometric configuration and also essentially independent of the thickness of the thermistor material employed, since the speed of response is controlled or is determined by the thickness of the outermost layer of contact.

In the drawings:

FIGURES 1 to 10 inclusive portray various steps in constructing a preferred embodiment of the subject thermistor.

FIGURES 11 to 13 inclusive portray an embodiment of forming a thermistor according to the subject invention.

Referring now to FIG. 1 of the drawings, the numeral 10 denotes a platinum wire approximately .001 inch in diameter and approximately 1 inch long. One end of the wire 10 is placed into a small flame supplied by a burner 12 until a bead 14 is approximately .003 inch in diameter is formed on the tip of the wire. Thereafter, the full length of the wire 10 is placed into the flame to remove the temper therefrom.

Referring now to FIG. 2 of the drawings, the numeral 16 denotes a droplet of thermistor material which is placed on the bead 14, as by employing a size #000 camel hair paint brush. The thermistor material 16 is formed of a mixture of 20 parts nickelous oxide (NIO), 9 parts cupric oxide (CuO) and 80 parts manganese sesquioxide ($Mn_2O_3$). The materials are ground in a motorized agate motor with the oxide ground individually for two hours while dry. The oxides are blended together in the above proportions and ground in water for approximately 1 hour. After the material is dry, a small amount of the dry material is ground in the hand operated agate motor for about 5 minutes and glycerin added and mixed with the material until it becomes a thick paste. Again referring to FIG. 2, the brush 18 is dipped into the mortar to obtain a small amount of the thermistor material and small doplets will form on the fine strands of the brush. One of these droplets is pulled off onto the platinum bead 14.

Referring now to FIG. 3 of the drawings, the thermistor material is moved around with one strand of the brush on the bead 14 until there is a smooth thermistor layer covering the bead. This thermistor layer is designated by the number 20. The numeral 22 denotes a heating coil heated to a temperature of approximately 200° C. whereby the glycerin is evaporated from the material 20. In preparing for the sintering of the thermistors, the thermistor beads are hung on a chromel A wire (not illustrated) with the bead hanging down, this being illustrated at FIG. 4 of the drawings wherein the thermistors are hung and separated so that they will not touch in a sintering oven for approximately 30 minutes at approximately 1030° C. The oven is not preheated and the temperature is brought up slowly and is allowed to drop off slowly. The cooling time is approximately 4 hours.

Referring now to FIG. 5 of the drawings, the numeral 24 denotes a portion of a glass tubing which encases the platinum wire as illustrated. The type of glass is designated as Corning 0088 with the outside diameter of the glass being approximately .005 inch. The glass tubing is cut into one-half inch lengths with the edges straight and clean. Preferably, a one-fourth inch tungsten carbide cutting tool is employed and has a new clean edge, and a line is first marked around the glass tube 24, the tubing then twisted with tweezers and broken off. Any kinks in the platinum wire tip are straightened and the platinum wire is inserted into the glass tube as illustrated at FIG. 5. The glass tube 24 may be picked up with a strip of masking tape and thereafter grasped with tweezers and thence mounted in a chuck.

Referring now to FIG. 6 of the drawings, the glass tubing 24 is heated by a heating coil 26 until the end of the glass tubing 28 is melted into the position illustrated. As can be seen from this figure, the glass is melted to form a seal around the platinum wire and material 20 just to the left of the bead 14.

Referring now to FIG. 7 of the drawings, the numeral 30 denotes solder glass commercially available from the Corning Glass Works and known as 7570 solder. This glass is picked up on the tip of a needle and the droplet placed in the position illustrated. Next, the heating coil 32 is employed to heat the solder glass to cause it to melt and flow to assume the form illustrated at FIG. 8. In connection with FIG. 8, it will be observed that the solder glass is not allowed to flow over the very tip of bead 14. Thus, the glass 30 is not allowed to flow over the extreme right hand portion of the bead 14 of FIG. 8. The glass 30 is melted until it looks smooth and serves to bond the glass tubing to the platinum wire 10 and to the thermistor material 20.

Referring now to FIG. 9 of the drawings, the partially formed thermistor of FIG. 8 is now in the form suitable for plating with platinum by a sputtering process. The numeral 34 denotes a platinum cup serving as the cathode suitably supported within a vacuum cavity denoted by the numeral 36. The base 38 of the vacuum cavity has an aperture therein for communication to a vacuum line 40 suitably secured to a vacuum pump 42. A steel base 44, serving as the anode, is positioned within the cavity 36 and electrical leads 46 and 48 are suitably secured as indicated to the anode and cathode. A DC power supply of 2000 volts and 10 milliamperes is coupled to the leads 46 and 48. The steel anode 45 may conveniently be approximately 13 x 13 x ½ inches and the vacuum pump may be Welch type 1405. The platinum cup 34 is inverted as illustrated, approximately 6 inches above plate 45 with the thermistors held in a vertical position approximately 1½ inches below the platinum cup 34. An electrical connection is made from anode 44 to the external surface of the glass tube 24, so that the resultant platinum layer 52, is illustrated in FIG. 10, extends over the greater portion of the entire thermistor 50. The thickness of the platinum film 52 is approximately 0.5 micron. As will be observed from FIG. 10, the platinum layer 52 is, at the extreme upper portion of bead 14, in direct contact with the thermistor material 20.

Referring now to FIGS. 11-13 of the drawings, an alternative method of manufacture of a thermistor according to the present invention is illustrated.

Referring now to FIG. 11, the thermistor material 20 is applied in the same manner as before described, particularly with reference to FIGS. 1-3 inclusive. Thereafter, a platinum flake 60 approximately 6.0 microns thick is positioned on the tip of the thermistor material 20, maintaining itself in the illustrated position of FIG. 11, probably due to static charge. The wire 10 and platinum flake are now sintered while being held in a vertical position as shown at FIG. 12. After sintering, the glass tubing is applied as before and thereafter the solder glass is applied, again as before described, with the exception that here less care is required to avoid covering the extreme tip of the bead 14 with the solder glass, since the platinum is now already on the tip. The sintering process of FIG. 12 takes place essentially as described with respect to FIG. 4, i.e., the same temperature and time parameters are employed.

Referring now to FIG. 13 of the drawings, a completed thermistor formed according to this modification is illustrated and here bears the reference numeral 50–M. It will be observed that the platinum plate 60 is in the same general position as illustrated at FIG. 11 and the similarity between the completed thermistor of FIGS. 10 and 13 will be otherwise apparent.

The advantages of the alternative mode of construction illustrated in FIGS. 11–13 is that the thermistor is very nearly waterproof, whereas the plating alone as in FIG. 10 can be porous if not perfectly applied. Further, the thermistor material is sintered after the positioning of the platinum plate and consequently an optimum electrical contact between the flake and the thermistor material is obtained. Thus, the area between the platinum at the very tip of bead 14 may be easily controlled by selecting a desired area of the platinum plate 60. Further, it will be observed that the plating 52 makes a better electrical contact with the platinum flake than with the thermistor material.

In use, it will be observed that a thermistor prepared according to the above described process displays the characteristic that heat flow is essentially normal to the electrodes 14 and 52 at the very tip of bead 14. It will further be observed that any temperature changes in a fluid in which the thermistor is placed will be immediately transmitted to and/or sensed by the layer 52. The rapid sensing at temperature changes of thermistors formed in accordance with the present invention is occasioned by the low mass of the device, good thermal conductivity, and high surface to volume ratio.

What is claimed is:

1. A thermistor comprising, an electrode having a bead at one end thereof, a coating of material displaying a change of electrical resistance with temperature over a portion of said bead, an electrical conductor in the form of a film deposited over the said material on said bead, the said bead making contact with the said material, the said material making contact with the said conductor film, the said bead and said film being in parallelism over at least a portion of said bead.

2. The thermistor of claim 1 wherein said material is a semi-conductor material displaying a negative temperature coefficient of electrical resistance.

3. The thermistor of claim 1 including a conductive flake between the said material and the said conductive film.

4. A thermistor comprising, a wire formed from an electrical conductor and having integrally on one end thereof an enlarged bead, a coating of a material displaying a change of electrical resistivity with temperature over the the surface of said bead, an insulating tube encompassing the major portion of said wire, a metallic film disposed over the external surface of said tubular member and extending over at least a portion of said bead, the said film and the said bead displaying parallelism over at least a portion of said bead, the said material being interposed between said bead and said film and being in contact with both.

5. The thermistor of claim 4 wherein said material is a semi-conductor material displaying a negative temperature coefficient of electrical resistance.

6. The thermistor of claim 4 including a conductive flake between the said material and the said conductive film.

7. A method of making a thermistor comprising the steps of, forming an enlarged bead on a wire formed of a conducting material, placing a layer of thermistor material over at least a portion of said enlarged bead, placing a portion of said wire into a tube formed of an electrical insulating material, melting a portion of the edge of said insulating tube which is contiguous to said bead, placing an insulating material around the juncture of said enlarged bead and said tube, and applying a conducting film over the external surface of said tube and at least a portion of said thermistor material on said bead.

8. The method of claim 7 including the step of sintering said layer of thermistor material.

9. A method of making a thermistor including the steps of, applying a coating of a thermistor material over a bead on one end of an electrode formed of conductive material, and then applying a conducting film to function as an electrode over said thermistor material, the bead and the conducting film being in parallelism over at least a portion of said bead.

10. The method of making a thermistor comprising the steps of, forming an enlarged bead on a wire formed of a conducting material, placing a layer of a thermistor material over at least a portion of said enlarged bead, placing a metal flake over a portion of said thermistor material, placing a portion of said wire into a tube formed of an electrical insulating material, melting a portion of the edge of said insulating tube which is contiguous to said bead, placing an insulating material around the juncture of said enlarged bead and said tube, and applying a conducting film over the external surface of said tube and over said metal flake.

11. The method of claim 10 including the step of sintering said layer of thermistor material.

References Cited

UNITED STATES PATENTS

| | | |
|---|---|---|
| 2,786,819 | 3/1957 | Smith et al. |
| 2,937,354 | 5/1960 | Mazzarella et al. _____ 338—22 |
| 3,197,725 | 7/1965 | Sapoff et al. _____ 38—22 |

REUBEN EPSTEIN, *Primary Examiner.*